Figure 1A:
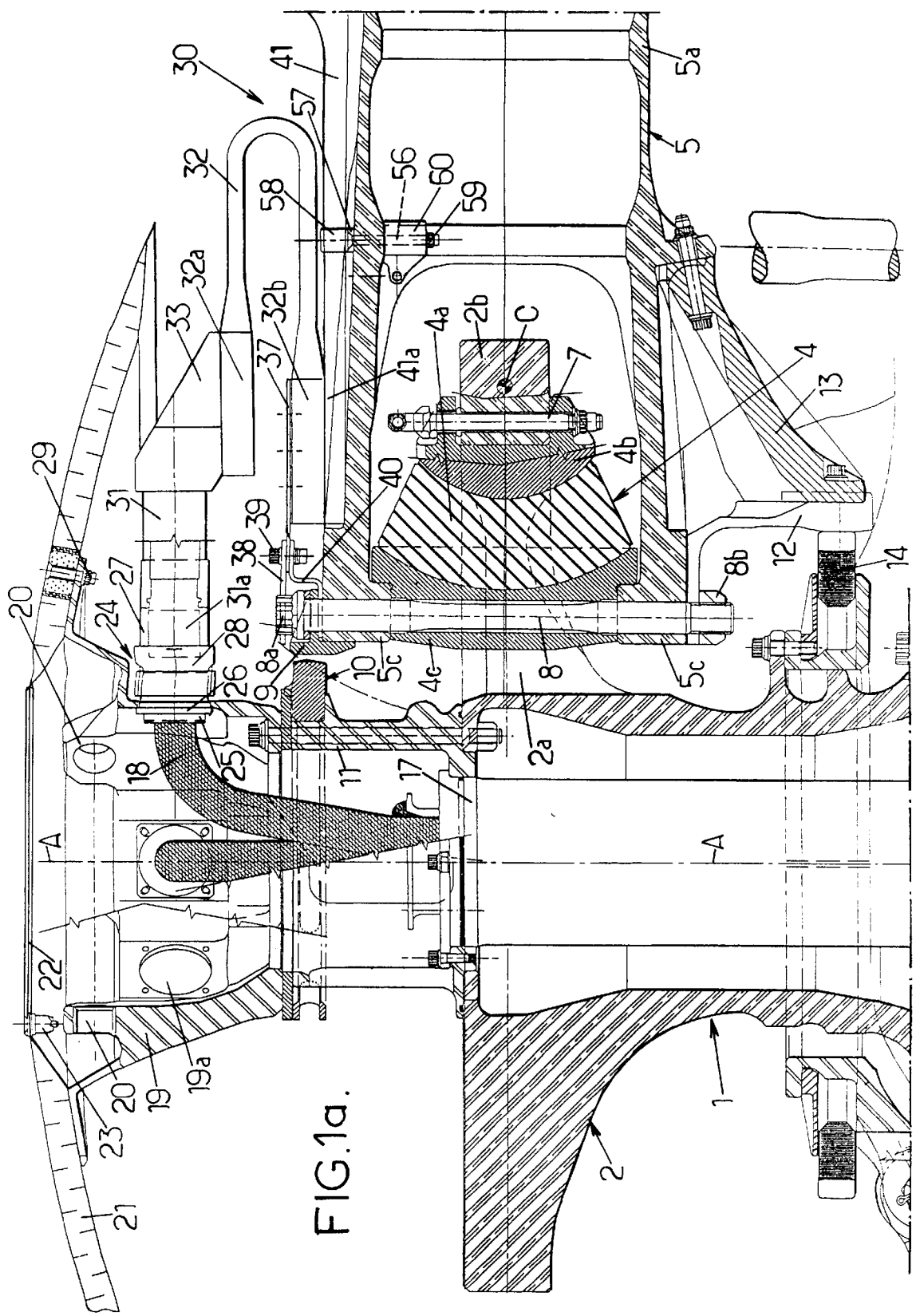

United States Patent [19]
Mondet et al.

[11] Patent Number: 5,769,606
[45] Date of Patent: Jun. 23, 1998

[54] DE-ICING CONNECTION INSTALLATION FOR ROTORCRAFT ROTOR

[75] Inventors: Jean Joseph Henri Mondet, Pelissanne; Serge Louis Roux, Marignane, both of France

[73] Assignee: Eurocopter France, Marignane, Cedex, France

[21] Appl. No.: 679,218

[22] Filed: Jul. 12, 1996

[30] Foreign Application Priority Data

Jul. 20, 1995 [FR] France .................................. 95 08805

[51] Int. Cl.⁶ .......................... B64C 27/39; B64C 27/50
[52] U.S. Cl. ...................... 416/134 A; 416/39; 416/140; 416/141; 416/143; 416/146 R; 244/134 D
[58] Field of Search ................................ 416/31, 39, 95, 416/134 A, 140, 141, 142, 143, 146 R, 107; 244/134 D; 219/201, 534, 541, 544; 174/68.1; 439/455, 456, 502, 503

[56] References Cited

U.S. PATENT DOCUMENTS

| | | |
|---|---|---|
| 3,042,346 | 7/1962 | Hawley ................................ 244/134 D |
| 3,455,396 | 7/1969 | Cummings . |
| 3,644,703 | 2/1972 | Nelson . |
| 4,252,504 | 2/1981 | Covington et al. ...................... 416/143 |
| 4,915,585 | 4/1990 | Guimbal ................................... 416/140 |
| 5,020,741 | 6/1991 | Ziegler et al. ....................... 244/134 D |
| 5,174,717 | 12/1992 | Moore . |
| 5,322,415 | 6/1994 | White et al. ............................. 416/143 |

FOREIGN PATENT DOCUMENTS 1139169  1/1969  United Kingdom ................... 219/544

*Primary Examiner*—Christopher Verdier
*Attorney, Agent, or Firm*—Larson & Taylor

[57] ABSTRACT

The installation links a supply conductor to an electrical device for de-icing a blade using at least one cable with a first stretch linked to the supply conductor by a connector and to a second stretch with an overhead hook in the form of flattened half loop, itself linked to the device for de-icing the blade by a second connector fitted on the blade, possibly via a straight and flat third stretch and a second overhead hook. The first hook is of nonscreened structure, with an elongate part of substantially flattened rectangular transverse section and with a concavity pointing towards a device for retaining and articulating the blade on a hub.

18 Claims, 8 Drawing Sheets

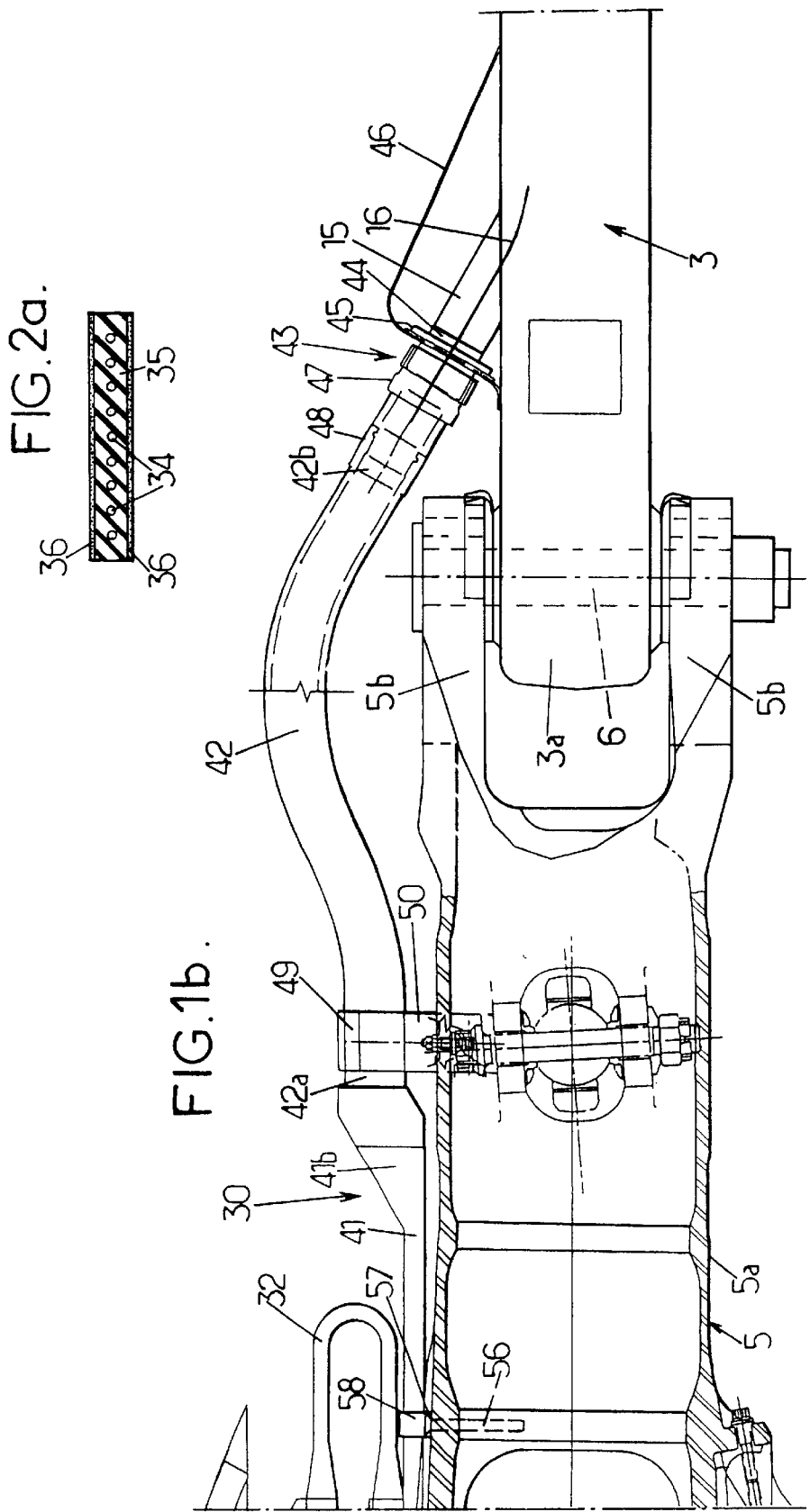

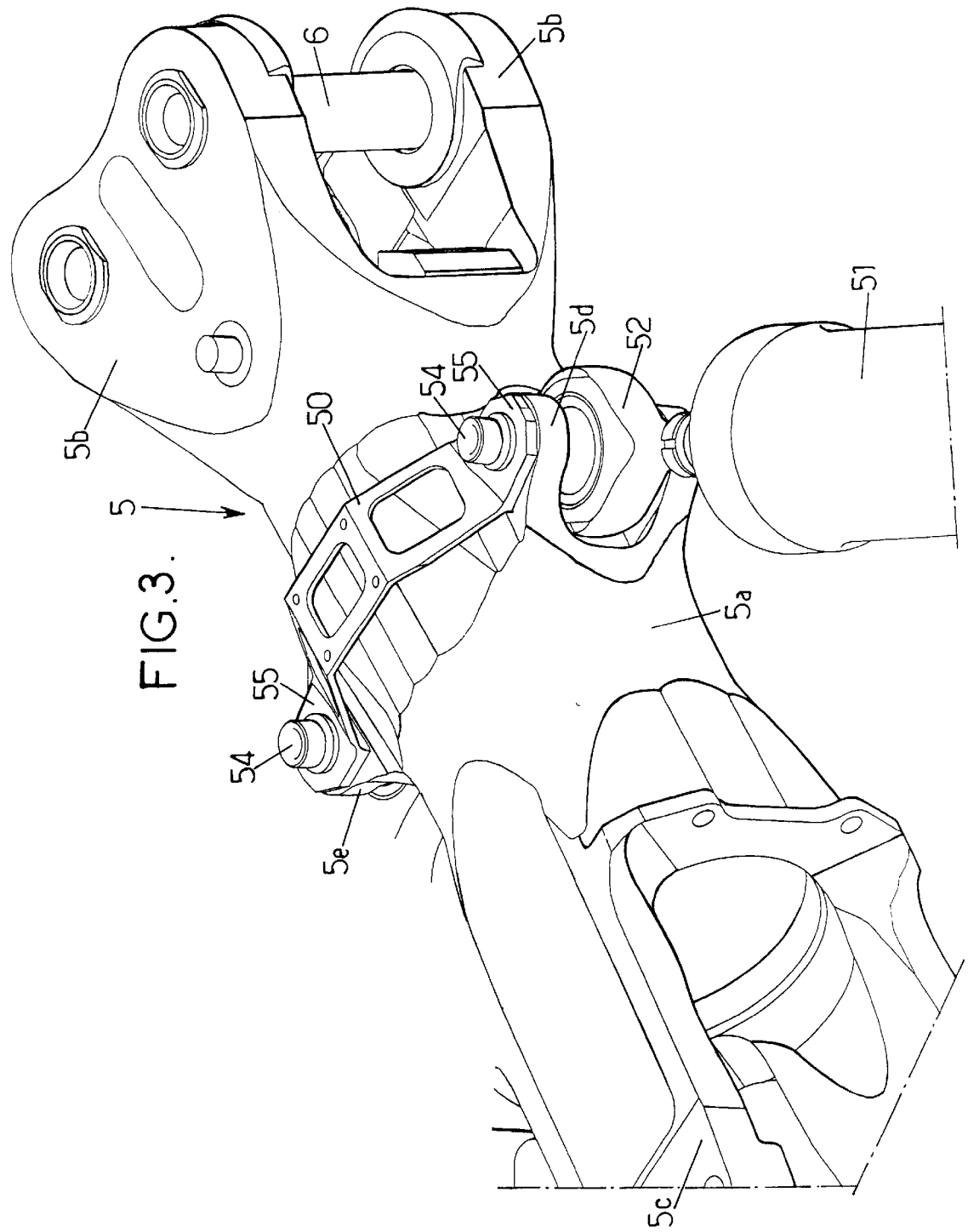

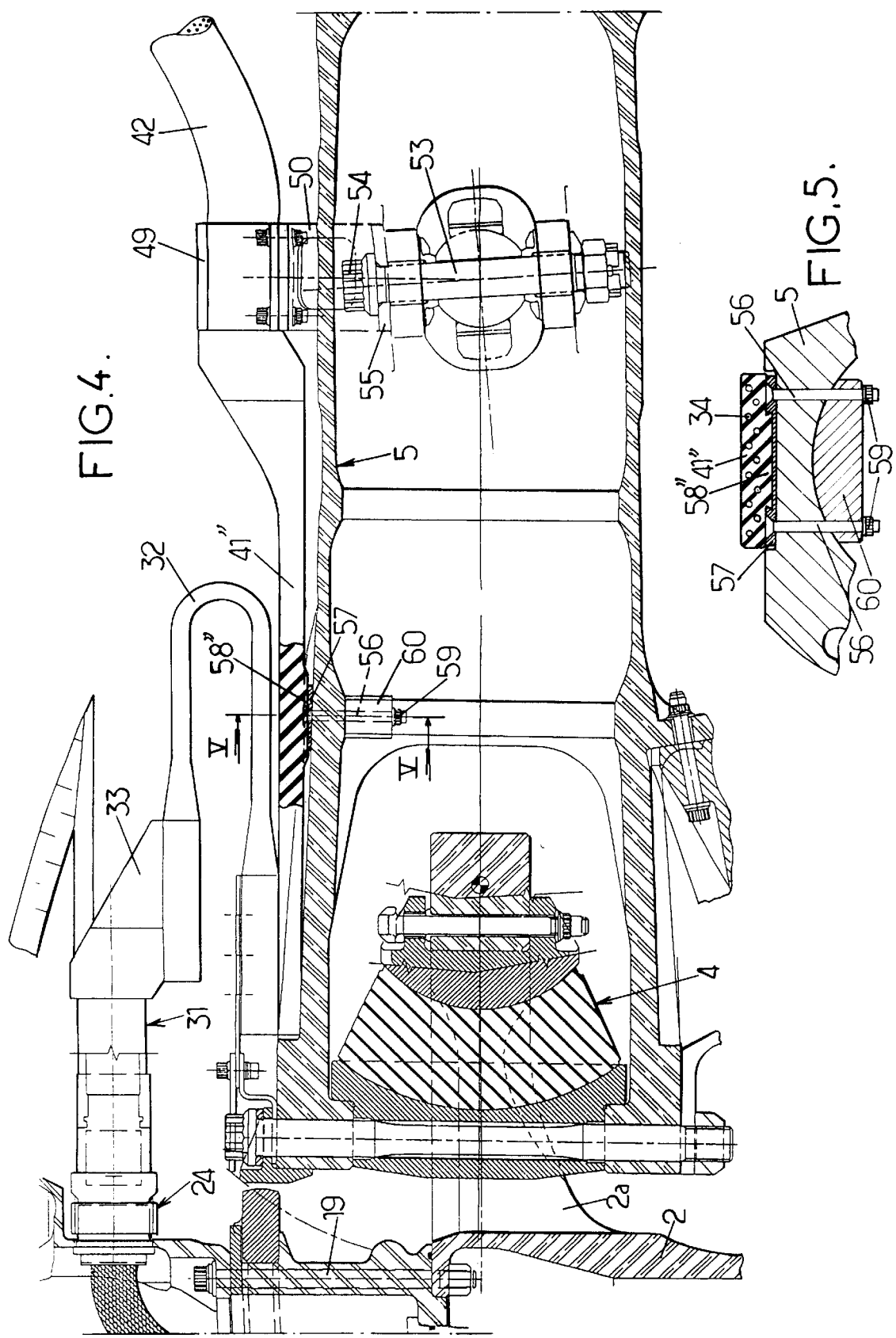

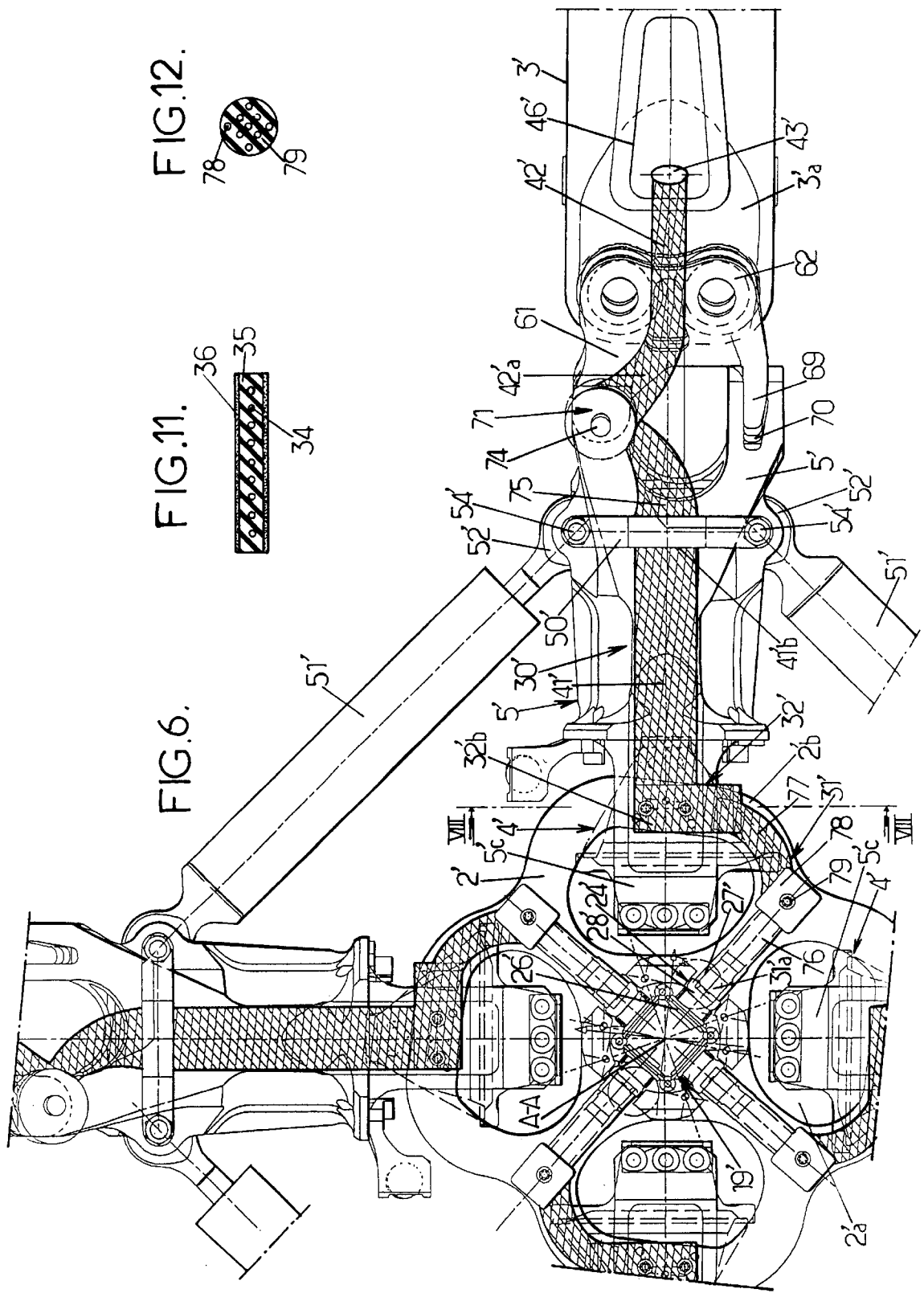

DE-ICING CONNECTION INSTALLATION FOR ROTORCRAFT ROTOR

The invention relates to an installation for electrical connection between at least one electric supply conductor and an electric device for de-icing a blade of a rotorcraft rotor, of the type comprising:
- a hub integral in terms of rotation with a rotor mast about an axis of rotation of the rotor, and
- at least two blades, each of which is linked to the hub by means of a linking member which is substantially radial relative to the axis of rotation and itself linked to the hub by retaining and articulating means.

An electric de-icing device should be understood, in this text, to mean any de-icing or anti-icing device which, for operating, commanding or controlling it, requires an electrical power supply.

It is known practice to equip the blades of rotorcraft, especially helicopter, rotors with electrical de-icing devices each of which comprises, in general, a loom of elongate electric conductors incorporated into the structure of a blade to be de-iced and supplied from an on-board electrical circuit of the rotorcraft via at least one connecting cable comprising at least one elongate electric conducting element and coupling at least one electric conductor of the de-icing device borne by the blade to at least one electric supply conductor borne by the hub, and in general mounted so that it is stationary in a reference frame which rotates with the mast-hub assembly, in a tubular part of this assembly in which there is also housed an electrical de-icing collector to which said supply conductor is coupled.

The connecting installation of the invention is of the type comprising at least one such connecting cable, and the problem at the root of the invention is that of improving the mechanical and electrical integrity of such a connecting installation relative to known ones currently equipping the rotors of helicopters having blades equipped with an electric de-icing device.

More specifically, the object of the invention is to propose a connecting installation of the type explained hereinabove, in which each connecting cable has a structure and follows a routing such as to attenuate the mechanical stresses on said cable, and also as to ensure better taking up of the forces acting upon this connecting cable when the rotor is rotating and each blade is performing its angular deflections in terms of pitch, flapping and drag.

To this end, the connecting installation according to the invention is characterized in that its connecting cable, connecting at least one electric supply conductor borne by the hub to at least one electric conductor of the de-icing device borne by a blade, comprises a first stretch, of which a first end, in an internal radial position, is linked to said supply conductor of the hub by a first connector mounted on the hub, and of which the second end is coupled to a first end of a second stretch of the connecting cable, said second stretch comprising a first overhead hook in the form of a flattened half loop, and its second end being linked to said de-icing conductor of said blade by a second connector fitted on the upper part of the blade, at least said first hook having an unscreened structure and exhibiting an elongate part of substantially flattened rectangular transverse section, the largest dimension of which is substantially perpendicular to the axis of rotation, as well as a concavity pointing substantially towards said retaining and articulating means, said first hook being deformable in bending and in torsion in order to accommodate the angular deflections in terms of pitch, drag and flapping of the blade and of its linking member relative to the hub.

Bearing in mind the advantageous fitting of the second connector on the upper part of the blade, substantially at the internal radial end of the airfoil part of this blade, so that it does not impede possible hinging thereof, and also bearing in mind the radial dimension of its linking member, which could just as easily be a forked blade root as be a member, distinct from the blade, commonly known as a cuff and shaped as a double clevis block for linking it, on the one hand, to the blade and, on the other hand, to the means for retaining and articulating on the hub, the installation is advantageously such that the second end of the second stretch of the connecting cable is linked to the second connector, being coupled to a first end of a third stretch of connecting cable running substantially radially along the corresponding linking member to which it is fixed by at least a first and a second link respectively close to its first end and second end in an internal radial and external radial position respectively, the third stretch being linked by its second end to said second connector and also having an unscreened structure, exhibiting an elongate part of substantially flattened rectangular transverse section, the largest dimension of which is substantially perpendicular to the axis of rotation.

This elongate part of the first hook and/or of the third stretch of the connecting cable advantageously comprises several elongate electric conducting elements, which are substantially mutually parallel, spaced apart and embedded in an insulating and elastically deformable jacketing matrix between strips of fabric on the long sides of its substantially rectangular transverse section, so that the structure of this elongate part allows the conducting elements to move relative to the strips of fabric providing mechanical strength, by virtue of the elastically deformable matrix, this making it possible to attenuate the mechanical stresses on the conducting elements and at the same time allowing a better take-up, at the strips of fabric, of the forces acting upon the connecting cable, particularly in its flexible and twistable part which constitutes its first overhead hook.

For a rotor in which each linking member is distinct from the root of the corresponding blade and includes an external radial part arranged as an external clevis block in which the blade root is held, the connecting cable of the invention is furthermore advantageously such that the second end of the third stretch of cable is linked to the second connector, being coupled to a first end of a fourth stretch of cable comprising a second overhead hook running from said linking member to the blade, and of which the second end is coupled to said second connector.

In this case, the second hook of the cable, which links the external radial part of the linking member to the blade, may, in a simple embodiment, exhibit a rounded transverse section, and the second connector may comprise, on the one hand, a base coupled to said de-icing conductor of the blade and equipped with a flange for fixing to the blade, and, on the other hand, a plug connected to the base and equipped with a coupling mounted on the second end of said fourth stretch of cable linked to the blade. As an option, the structure of this second overhead hook of the connecting cable may be screened, in which case the base, the plug and the coupling of the second connector are also screened.

When the root of each blade is held in the external clevis block of the corresponding linking member by two substantially mutually parallel pins, one of which is removable to allow the blade to be folded back manually relative to the linking member by pivoting about the other pin, the plug of the second connector on the second end of the fourth stretch of cable is advantageously connected removably to the corresponding base, fixed to the blade, of the second connector, so as to allow manual disconnection and manual connection of the second connector respectively before hinging the blade and after putting the blade back into a flight configuration.

By contrast, if the rotor is such that, for each linking member, the external clevis block holding the root of the corresponding blade is arranged in a hinging fitting constituting the external radial part of the linking member and mounted on the latter by a link pivoting about an axis of hinging of the blade with the fitting relative to the linking member, in order to allow "automatic" hinging of the blade using at least one actuator mounted on the linking member and commanding the pivotings of the fitting relative to this linking member, it is then advantageous for the second hook of the connecting cable to run from the second connector, on the blade, to a rotating part of a rotating coupling also comprising a stationary part on the linking member, and on which the rotating part is mounted so that it can rotate coaxially with the pivoting link of the hinging fitting on the linking member, the stationary part of the rotating coupling being linked to the second end, the external radial end, of the third stretch of cable by a part of the fourth stretch of cable which preferably runs along the linking member. In this way, this embodiment with a rotating coupling makes it possible to command the automatic folding-back and unfolding of the blade without having to perform disconnection or connection at any one of the two connectors of the installation.

Whether the blade is hingeless, or can be folded manually, or by virtue of an actuator, the first stretch of cable may, in a simple embodiment, comprise at least one radial part of rounded transverse section, the internal radial end of which is mounted in a coupling of a plug of the first connector, said plug complementing a base of the first connector, which base is coupled to the supply conductor on the hub and equipped with a flange mounted on the hub. As an option, the structure of this radial part may be screened, in which case the coupling, the plug and base of the first connector are also screened. Bearing in mind the space available on and around the hub, the linking members, the retaining and articulating means, the top and bottom flap stop systems with which the rotor may be equipped, as well as other equipment which may be mounted on the hub, such as slinging shroud and profiled cover, according to a first advantageous embodiment, the radial part of the first stretch of cable runs along substantially the entire length of the first stretch above the linking member and substantially in the same radial direction thereas, the first hook of the cable having a concavity pointing substantially radially towards the axis of rotation, so as to have a configuration favourable to its deformations in torsion and in bending in order to adapt itself to the deflections, relative to the hub, of the part of the linking member to which it is linked.

However, if the radial part of the first stretch of cable cannot run substantially above the linking member and/or along the entire length of this first stretch, for reasons of space availability, according to a second advantageous embodiment, this radial part of the first stretch of cable runs between two neighbouring linking members of the rotor, and the external radial end of this radial part is, on the one hand, fixed to the hub by a link and, on the other hand, extended towards the first hook of the cable by part of the first stretch running in a substantially circumferential direction on the hub and of substantially flattened rectangular transverse section, the largest dimension of which is substantially perpendicular to the axis of rotation, the first hook having a concavity pointing in a substantially circumferential direction towards the corresponding linking member.

In these various embodiments, at least a part of rounded section of the cable, but preferably of each of them, is coupled to at least a part of substantially flattened rectangular section by a coupling with changing section and/or at least one link of the connecting cable to the linking member may comprise a connecting clamp overmoulded on the connecting cable, to make it easier to mount.

In particular, in order to avoid whipping of the third stretch of cable against the linking member, and in order to protect both this stretch of the cable and the linking member, for a rotor in which the internal radial part of each linking member is arranged as an internal clevis block and the corresponding retaining and articulating means comprise an armature fixed between the branches of the internal clevis block by threaded spindles with a head retained by head retainers, it is advantageous for the first link of the connecting cable to the linking member to be provided using at least one support for said head retainers, the support itself being retained on the linking member by at least one of the threaded spindles.

Likewise, for a rotor in which each linking member is linked to the hub or to the neighbouring linking members by two drag dampers each articulated by one end in one respectively of two clevis blocks projecting laterally on the opposite sides of the linking member radially on the outside of the corresponding retaining and articulating means, it is advantageous for the second link of the connecting cable to the linking member to be provided using a strap arranged transversely on the linking member on which it is held by retaining pins which hold the drag dampers in said side clevis blocks.

Depending on the radial length of the linking member, the connecting cable may be fixed to the latter by an additional link part way between the first link and second link, the additional link advantageously being provided by a sliding bearing comprising a part projecting beneath the third stretch of cable and in the shape of a dovetail, and which is mounted so that it can slide in the radial direction of the linking member in a complementary dovetail-shaped recess formed in the upper part of the linking member. This sliding bearing, which advantageously allows relative movement of this stretch of cable relative to the linking member, may be such that the dovetail-shaped recess is formed either in a sliding bearing plate fixed on the top face of the linking member or directly in the upper part of this linking member, if its structure allows this.

Figure 2:
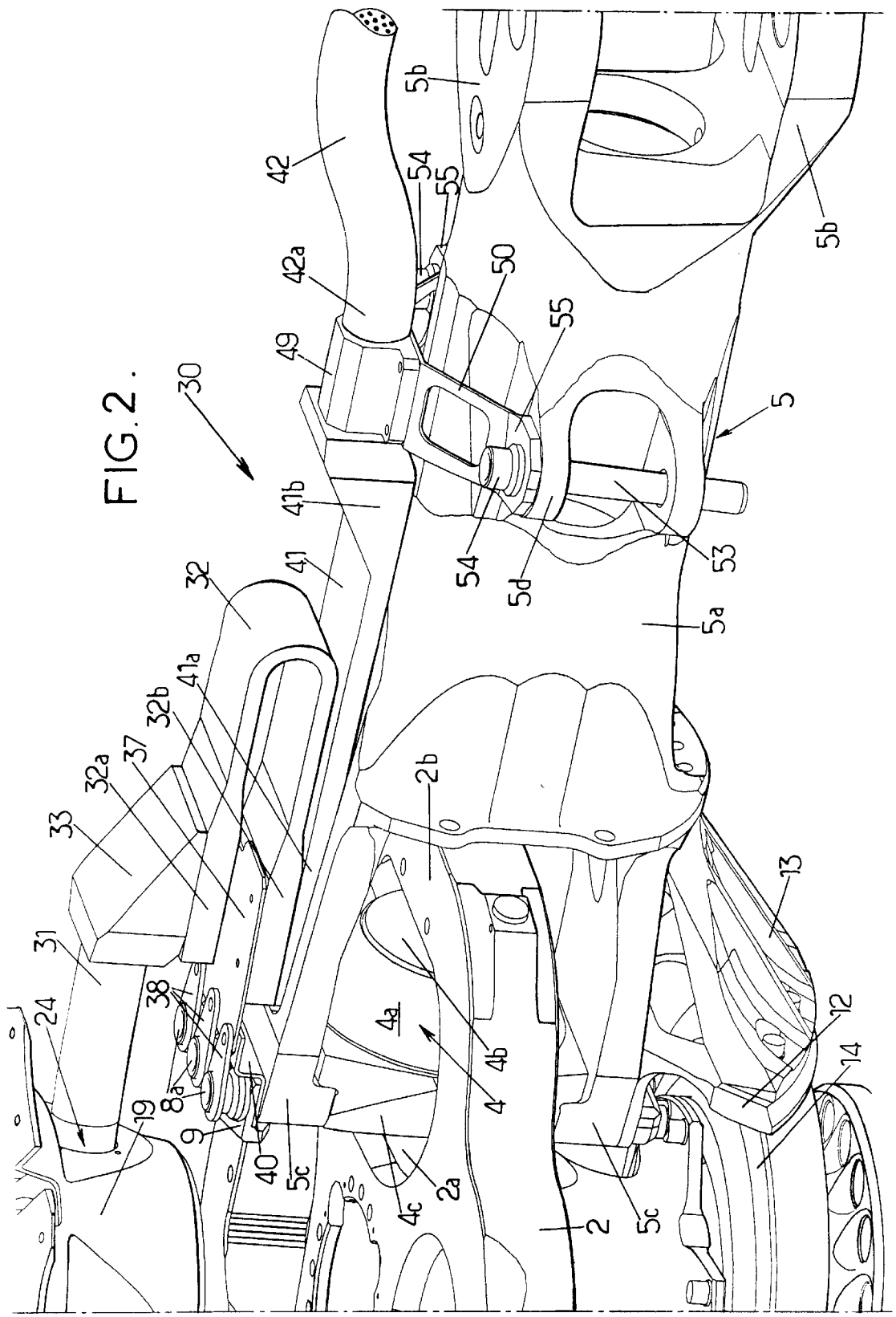
Figure 7:
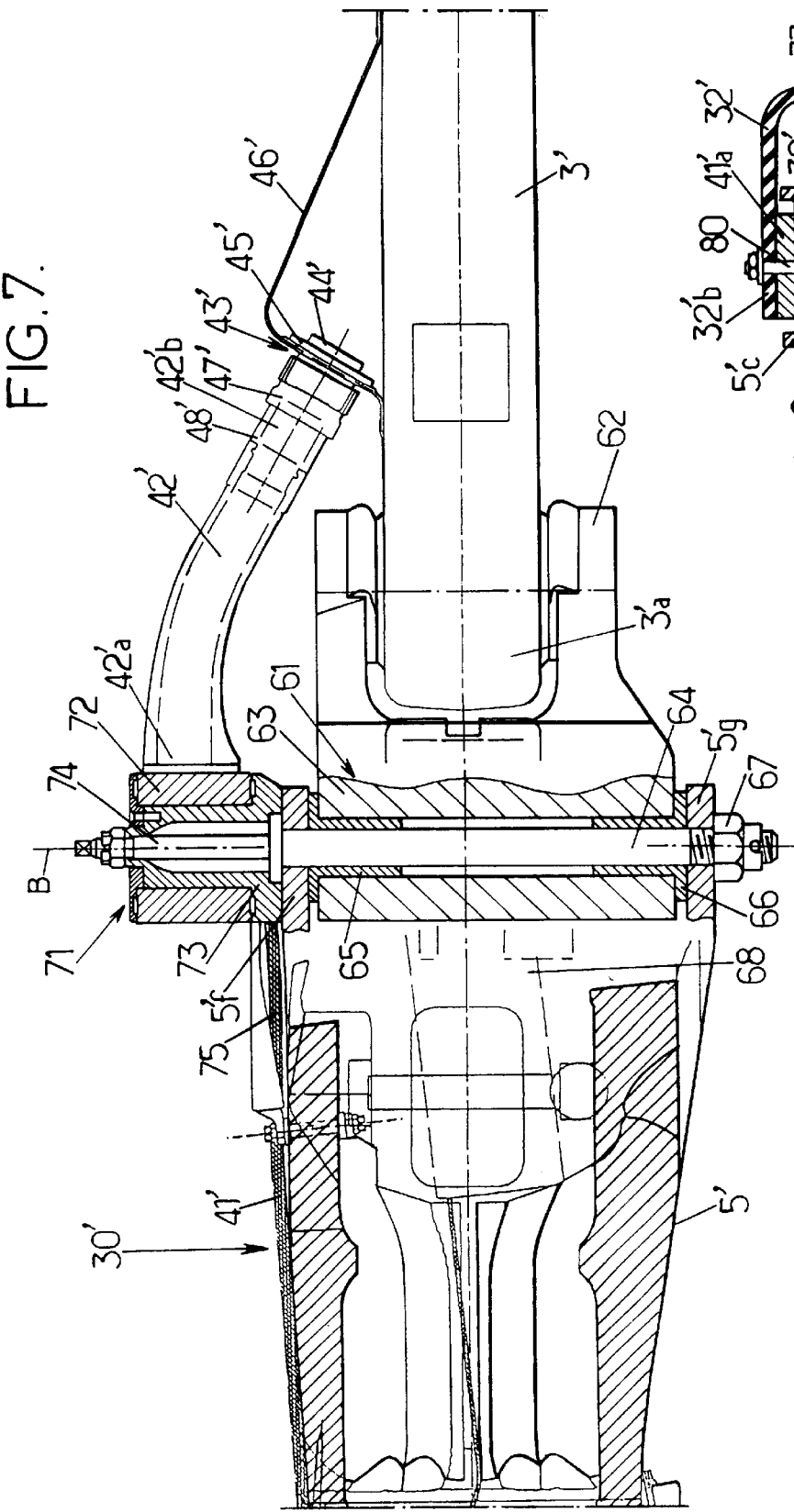
Figure 8:
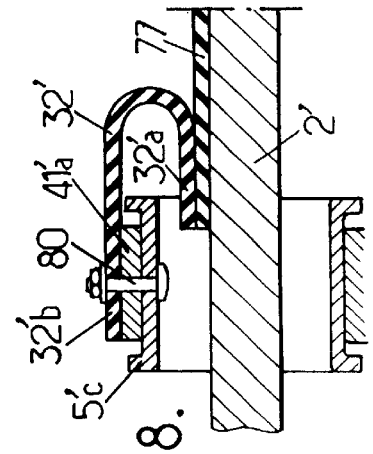
Figure 13:
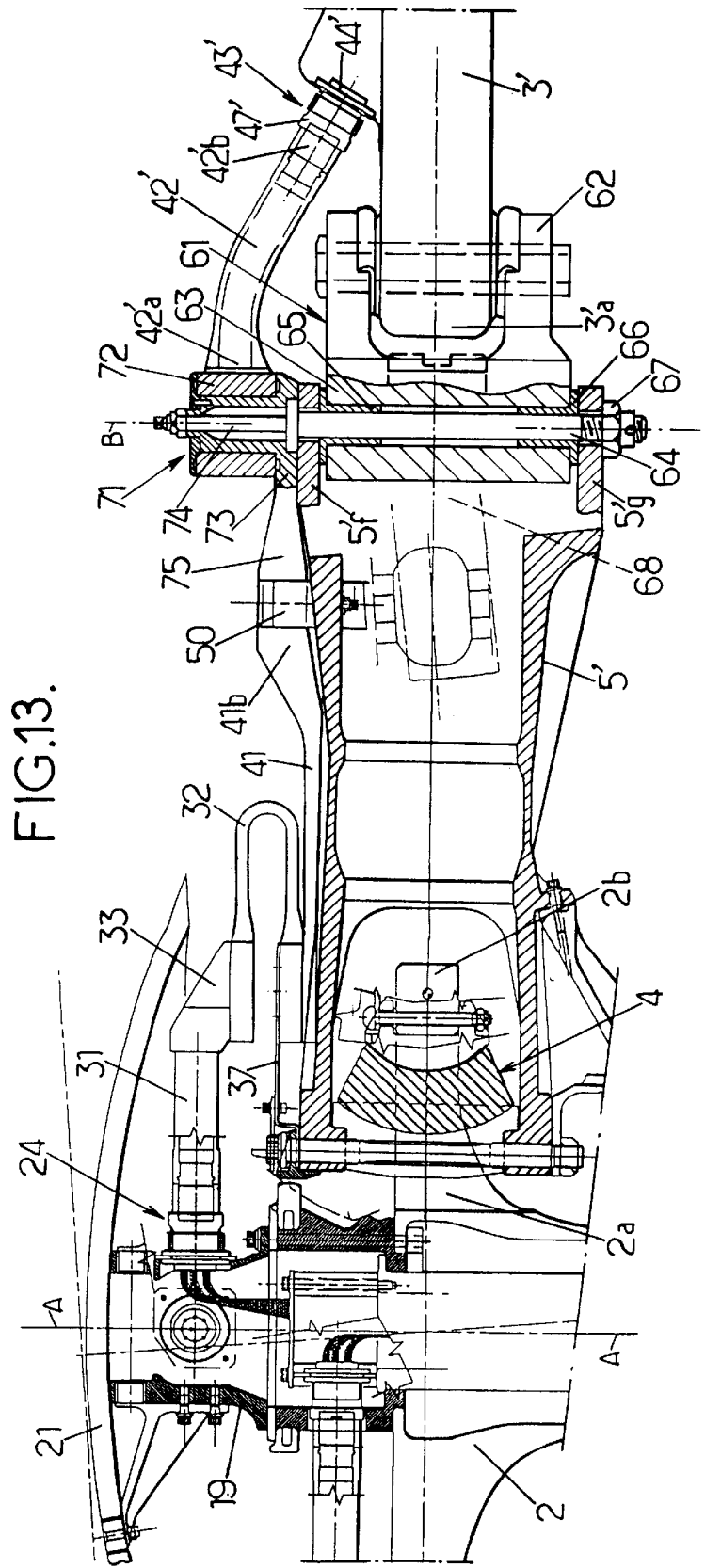

Further advantages and features of the invention will emerge from the description of embodiments which are described hereinbelow without implied limitation and with reference to the attached drawings in which:

FIGS. 1a and 1b partially represent a first example of a de-icing connection installation for a helicopter four-bladed main rotor with blades connected to the hub by linking members in the form of cuffs with double clevis block in which the blades can be folded manually, FIG. 2 is a part view in perspective of the installation and of the rotor of FIG. 1, FIG. 2a is a diagrammatic transverse section of stretches of the connecting cable of FIGS. 1 and 2, FIG. 3 is a part view in perspective of the cuff of FIG. 2 attached to a drag damper, FIG. 4 is a part view, partly in section and partly in side elevation, of an alternative to the installation of FIGS. 1 and 2, with additional fixing of the connecting cable to the cuff, FIG. 5 is a view in part section on line V—V of FIG. 4, FIG. 6 is a diagrammatic part view in plan of a second example of a connection installation for a four-bladed rotor in which each blade is linked to the hub by a linking member in the form of a cuff with a hinging fitting in which the blade root is held and with which the blade is folded automatically, FIG. 7 is a diagrammatic part view, partly in section and partly in side elevation of the installation of FIG. 6, FIG. 8 is a view in section of line VIII—VIII of FIG. 6, FIGS. 9 to 12 diagrammatically represent sections of the stretches of the connecting cable of the installation of FIGS. 6 and 7, and FIG. 13 is a view similar to FIG. 1 for an embodiment alternative, with rotating pick-up, for a rotor with automatically folding blades.

FIGS. 1a and 1b partially represent a helicopter four-bladed main rotor, in which the tubular rotor mast 1 has its upper part as a single piece with a hub 2, rotating with it about the axis of rotation A—A of the rotor. The hub 2 is arranged as a radial plate (relative to the axis A—A) with cavities, having, for each of the four blades 3 of the rotor, a cavity 2a passing axially through an external radial part of the hub plate 2 in order to accommodate partially, means 4 for retaining and articulating to the hub 2 a member 5 for linking the corresponding blade 3 to the hub 2.

The linking member 5, termed cuff in the rest of the description because its central part 5a is tubular, as visible in FIGS. 2 and 3, is a member arranged substantially radially relative to the axis A—A, and the external and internal end parts of which are respectively formed into an external clevis block 5b with two parallel branches between which the root 3a of the blade 3 is held, and into an internal clevis block 5c, the two parallel branches of which provide the link with the retaining and articulating means 4.

In the known fashion, the blade root 3a is held in the external clevis block 5b by two mutually parallel pins 6 which are symmetric on each side of the longitudinal axis of the cuff 5 and are substantially perpendicular to this longitudinal axis. One of the pins 6 is removable so that the blade 3 can be hinged manually towards the front or towards the back of the helicopter, after the rotor stops, by pivoting relative to the cuff 5 about the other pin 6.

As is also known, the retaining and articulating means 4 consist of a laminated spherical stop comprising a central part 4a consisting of an alternating stack of layers of an elastically deformable material and of cups made of a rigid material in the form of portions of spheres between, on the one hand, an external radial armature 4b straddling the external radial edge 2b of the corresponding cavity 2a in the hub 2, and fixed to this edge 2b of the hub by threaded spindles such as 7 and, on the other hand, an internal radial armature 4c passing through the cavity 2a and fixed as a spacer piece between the branches of the internal clevis block 5c by three threaded spindles such as 8, the flanged tightening heads 8a of which hold an upper heel 9 fixed to the internal radial end of the upper branch of the internal clevis block 5c facing an anti-cone stop mechanism 10 which can be retracted in flight, mounted on a tubular support 11 bolted above the tubular central part of the hub 2. The anti-cone stop device 10 is not described further because it does not form part of the invention. Similarly, the nuts 8b which are screwed onto the lower ends of the spindles 8 hold a lower heel 12 fixed under the internal radial end of the lower branch of the internal clevis block 5c, this lower heel 12 being held by a spacer piece 13 bolted to a lower flange of the cuff 5 so that the lower heel 12 is radially opposite a bottom flapping stop common to all the blades and produced, in the known fashion, in the form of a droop restrainer ring 14 mounted with radial clearance around the rotor mast 1.

Each blade 3 is equipped with a de-icing or anti-icing device (not represented) comprising a loom of electrically conductive wires integrated into the blade 3, close to the leading edge of its airfoil part, and the internal radial end of this conductive loom emerges on the upper face of the blade 3 close to its blade root 3a in the form of a de-icing cable represented diagrammatically at 15 and grouping together several elongate electric conductors, one of which is diagrammatically represented as 16, of the device for de-icing the blade 3. The de-icing cable 15, of a conventional structure including an outer jacket surrounding the conductors 16 which are insulated from one another, possibly with the interposition of screening, has to be supplied with electricity from an electrical collector 17 represented diagrammatically mounted in the tubular central part of the hub 2 and bolted into the base of the support 11 fixed to the hub 2. For each blade 3, the output from the collector 17 is connected to an electric supply cable 18 of conventional form and conventional structure, for example of circular section with screening, comprising a jacket which surrounds a bundle of conductive wires enveloped in an insulating substance, and the cable 18 is coupled to the screened base 25, which has a square fastening flange 26, of a connector 24. Each of these four bases 25, with flange 26, at the end of the corresponding supply cable 18 emerging freely from the top of the collector 17 is fitted into a corresponding housing 19a formed in the wall of an annular cover support 19, to which each base 25 is fixed by its flange 26, for example using four screws. The support 19, of a single piece in aluminium equipped with slinging rings 20 at its upper part, supports a profiled cover 21 attached by bolts 29, the central part of which is closed off via a removable outer cover 22 fixed to the cover 21 by a quick-fix mechanism 23 of known type, like the one marketed under the name "CAMLOC". In order to allow the collector 17 to be mounted in its housing from above, and after the outer cover 22 has been dismantled, the support 19 is flared towards the top, and mounted directly on the tubular support 11 of appropriate internal section. The flared support 19 for the cover 21 with quick-removal outer cover 22 has the advantage of quick maintenance in the fitting and removal of the collector 17 and of the bases 25 of the connectors 24 and for attachment to a sling by the rings 20 for handling the hub or the entire helicopter.

The electrical coupling of the conductors of the supply cable 18 to the conductors such as 16 of the de-icing cable 15 of the blade 3 is provided by a connecting cable 30 with a changing structure and changing shape of section which essentially comprises four stretches in series.

The first stretch 31 is straight, with conventional or screened structure, of circular section, and arranged radially above the internal clevis block 5c of the corresponding cuff 5, being orientated substantially in the radial direction thereof, and the internal radial end 31a of the stretch 31 is mounted in a screened coupling 27 of a screened plug 28 connected into the base 25 of the connector 24. The external radial end of the stretch 31 is coupled to a first end 32a of the second stretch 32 by a coupling 33 of changing section, because the second stretch 32 consists of an elongate part of flattened rectangular transverse section and which is folded back on itself into a flattened half loop forming an overhead hook with a concavity turned towards the axis of rotation A—A, the hook 32 running radially like the cuff 5, to which it is linked by its second end 32b, vertically below the first end 32a, as described hereinbelow.

The rectangular section of the hook 32, with nonscreened structure, is like that represented in FIG. 2a, the ends 32a and 32b simply being thicker than the elongate central part bent into a hook. This stretch of cable 32 comprises, according to FIG. 2a and by way of example, nine elongate electric conducting elements, such as copper wires 34, which run substantially parallel and spaced apart embedded in an electrically insulating and elastically deformable jacketing matrix 35, for example one made of elastomer or of natural rubber. This matrix 35 is confined between two strips of fabric 36 constituting the large faces of the stretch of cable 32. Because the stretch is arranged as a hook 32, the long sides of its rectangular transverse section are substantially perpendicular to the axis of rotation A—A of the rotor. The fabric 36, for example a woven fabric with a predominance of longitudinal carbon or aramid fibres, gives the structure good tensile strength which is necessary because this stretch of cable 32 is designed to be stretched by the effect of centrifugal force as the rotor rotates in order to limit the parasitic stresses which could be exerted on this stretch of cable 32 through an effect like a flag flapping in the relative wind, while the presence of the elastically deformable matrix 35 between the conductors 34 and the strips of fabric 36 to which this matrix 35 is vulcanized affords a possibility for relative longitudinal sliding between the conductors 34 and the fabric 36, which allows a certain dissociation between the mechanical stresses and the electrical stresses. Although it is lightweight, this stretch of cable 32 thus arranged as a flattened hook is endowed both with good tensile strength and with good flexibility for deformation in bending and in torsion, which allows it to accommodate the centrifugal movements such as angular deflections in terms of pitch, flapping and drag of the cuff 5 and of the blade 3 about the centre of articulation C of the laminated spherical stop 4, this centre C lying in the corresponding edge 2b of the hub 2.

The link of the end 32b of the hook 32 to the cuff 5 is provided using a thin plate 37 overmoulded on the end 32b or fixed thereto by screws or rivets, and this thin plate 37 acts as a support for the retainers 38 for the tightening heads 8a of the threaded spindles 8 linking the internal armature 4c to the branches of the internal clevis block 5c. Bolts 39 simultaneously fix the head retainers 38 to the thin support plate 37 and the latter to an arm of a bent back thin plate 40, the other arm of which is pressed against the upper face of the internal radial end of the upper branch of the internal clevis block 5c, being tightened down against the latter by the upper heel 9 and the threaded spindles 8 which pass through it.

The end 32b of the hook 32 is also mechanically and electrically coupled to the internal radial end 41a of a third stretch of cable 41 which is straight, runs radially along the upper face of the cuff 5 as far as its external radial end, formed into a coupling with changing section 41b, lying radially on the outside of the hook 32, the stretch of cable 41 having the same nonscreened structure and same flattened rectangular sectional shape as the hook 32, as represented in FIG. 2a. The central part of the stretch 41 is therefore an elongate part, the largest dimension of the rectangular transverse section of which is substantially perpendicular to the axis of rotation of the rotor when the cuff 5 is at rest.

The coupling of changing section 41b is used to couple the straight stretch of cable 41 mechanically and electrically to a first end 42a of the fourth stretch of cable 42, constituting a second overhead hook which links the cuff 5 to the blade 3, being coupled by its second end 42b to the de-icing cable 15 of the blade 3 by a second connector 43.

This connector 43 is screened and comprises a base 44 coupled to the de-icing cable 15 and equipped with a flange 45 by means of which the screened base 44 is fixed to a support 46 projecting from the upper part of the blade root 3a, outside the region thereof which is received in the external clevis block 5b of the cuff 5. The connector 43 also comprises a screened plug 47 which connects removably into the base 44, and this plug 47 includes a screened coupling 48 in which is mounted the end 42b of the hook 42, of which the section is circular and the screened structure similar to that of the first stretch of cable 31.

In this way, the first and second overhead hooks 32 and 42 of the connecting cable 30 link the cuff 5 respectively to the hub 2 (via the first stretch of cable 31) and to the blade 3, and the connecting cable 30 is linked to the cuff 5 close to the internal radial end 41a of the stretch 41 by a first link, provided by the thin plate 37, and close to the external radial end 41b of the stretch 41 by a second link which is now described.

This second link comprises a metal clamp 49 (see FIG. 2) for example made of aluminium, overmoulded around the end 42a of the hook 42 and fixed to the flat central part of a stainless steel strap 50 by four bolts or four screws interacting with captive nuts in the strap 50 which is arranged transversely over the top of the cuff 5 and fixed permanently to the latter by its ends, at fasteners to the cuff 5 of two drag dampers such as 51 (FIG. 3) each linking the cuff 5 in question to one of the two neighbouring cuffs 5 respectively, using an inter-blade damper configuration. For these fasteners to two dampers 51, each cuff 5 has two lateral clevis blocks 5d and 5e projecting from the opposite sides of the tubular part 5a, that is to say in a position situated radially outside the laminated spherical stop 4. The corresponding end of each drag damper 51 consists of a ball-ended fitting 52, held in the lateral clevis block 5d or 5e of the corresponding side by a pivot pin 53 with a flanged head 54. The strap 50 is fixed to the cuff 5 by its two flat and pierced ends 55, each held on a clevis block 5d or 5e by the pivot pin 53 of the corresponding drag damper 51, while being held between the clevis block 5d or 5e and the corresponding flanged head 54, thus acting as a washer for the head 54 of the pin 53. This configuration makes it possible not to have to remove the pins 53 attaching the dampers 51 in order to remove the connecting cable 30, by detaching the overmoulded clamp 49 from the strap 50.

As represented in FIG. 2, the stretch of cable 41 may be left free between the two links to the cuff 5 which are close to its ends, particularly if the upper face of the cuff 5 has a protective coating on contact with this stretch of cable 41.

However, to avoid the stretch 41 rubbing on the upper part of the cuff 5, an additional link may be produced, as represented diagrammatically in FIG. 1, using two threaded spindles 56 with countersunk head passing through the upper wall or the upper branch of the internal clevis block 5c of the cuff 5 in order to fix against it a plate 57 acting as a base for an additional bearing 58 for fixing the length of cable 41 to the cuff 5 between the two links described hereinabove.

A preferred embodiment of this additional bearing is represented in FIGS. 4 and 5, relating to an alternative form of the previously described example. In this alternative form, the two threaded spindles 56 have their countersunk head embedded in the lateral parts of the plates 57, on each side of a central dovetail-shaped slot formed in this plate 57, which is housed in a recess in the upper face of the cuff 5, and the nuts 59, screwed onto the ends of the threaded spindles 56 passing through the cuff 5 are tightened down against a support 60 through which the spindles 56 pass and tightened down against the internal face of this upper wall of the cuff 5. In this alternative form, the third stretch of cable 41", which has for example eleven conducting wires 34, has, in the region which faces the plate 57, a part 58" projecting under its lower face, and in the shape of a dovetail, mounted so that it can slide in the radial direction of the cuff 5 in the complementary dovetail-shaped recess in the plate 57 so as to form a sliding bearing allowing the stretch of cable 41" to be held with a freedom of movement along the axis of the cuff 5, but without the possibility for whipping or transverse rubbing.

In an alternative form which dispenses with the spindles 56, the plate 57, the nuts 59 and the support 60, and when the structure of the cuff 5 allows this, the dovetail-shaped slot which takes the projection 58" of the stretch of cable 41" is produced directly in the upper wall of the cuff 5.

As far as the rest is concerned, the example of FIGS. 4 and 5 does not differ from that of FIGS. 1 to 3.

A de-icing connection installation is thus achieved using a connecting cable which is routed between the two end connectors 24 and 43 relatively directly allowing a less stressed arrangement, the structure and cross-sectional shape of the stretches of cable being suited to the locations and to the local mechanical stresses, the only highly stressed region being that of the first overhead hook 32 which, because of its arrangement as close as possible to the centre of articulation C of the entire flapping mass consisting of the cuff 5 and the corresponding blade 3, because of its orientation and its structure which is flexible in torsion and in bending, is good at accommodating the relative movements of the flapping mass (3–5) and of the hub 2 during the rotation of the rotor and the movements in terms of pitch, drag and flapping of the flapping mass. What is more, the forces coming from this overhead hook 32 are taken up on the thin support plate 37 for the retainers 39 of the spindle heads 8a, and it is possible to disconnect the stretch of cable 31 with the plug 28 from the base 25 without special dismantling.

In order to limit the length of the second overhead hook 42 of the connecting cable, its end 42b mounted in the coupling 48 of the plug 47 of the connector 43 will be disconnected from the base 44 of this connector before the blade 3 is folded relative to the cuff 5, then reconnected after the blade 3 is returned to the flight configuration. This makes it possible to limit the overall length of the connecting cable, whereas the use of a cable with conventional circular section in the stretches which do not move much, namely the first stretch 31 and the second hook 42 while the section of the cable is rectangular and flexible in the very highly stressed region of the first overhead hook 32, makes it possible to adapt the stretches of cable to suit the mechanical stresses and locations where they are fitted.

The second embodiment of FIGS. 6 and 7 can be distinguished essentially from the previously described one only in the form of the first stretch of cable, the orientation and arrangement of the first overhead hook, and the forming of the fourth stretch of cable with a rotating coupling, because this example of a de-icing connection installation equips a rotor on which each blade can be folded automatically relative to its cuff for linking to the hub, by virtue of an actuator arranged in the cuff and causing a hinging fitting to which the blade is fixed by its root to pivot on the latter so that the elements which are similar are identified by the same numerical references with a prime symbol.

Each blade 3' has its root 3'a fixed by two pins into a clevis block 62 of a hinging fitting 61 which is mounted so that it can pivot on the external radial part of the cuff 5' about a geometric axis of hinging B—B which is offset laterally relative to the longitudinal axis of the cuff 5', by virtue of a cylindrical and lateral bearing 63 on one side of the fitting 61 which pivots about a pin 64 of the hinging articulation. This bearing 63 is held in an external and lateral radial clevis block with upper branch 5'f and lower branch 5'g of the cuff 5' by the pin 64, about which the bearing 63 pivots thanks to stepped rings 65 and 66 engaged around the pin 64 and in the bearing 63, and each resting against a face, respectively the upper face and the lower face, of the bearing 63, a nut 67 being screwed and held on the threaded lower end of the pin 64 which projects beneath the lower clevis block branch 5'g. The pin 64 is coaxial with the axis of pivoting B—B in order to obtain, by the manoeuvring of an actuator represented diagrammatically as 68 in FIG. 7 and fixed by its body into the cuff 5' by any appropriate means, the pivoting of the fitting 61. On the opposite side from the coaxial bearing 63, the fitting 61 has a stop 69 turned towards the cuff 5' and which becomes housed in a housing 70, open radially towards the outside of this cuff 5', when the fitting 61 is in a position not folded by the actuator 68, and which corresponds to the flight configuration (see FIG. 6). The manoeuvring of the actuator 68 makes it possible, in the known fashion, to cause the fitting 61 and the blade 3' to pivot through a maximum angle of 135° for example, about the axis B—B.

In this case, in order to limit the length of the second overhead hook 42' of the connecting cable 30' without having to disconnect the plug 47', mounted on its end 42'b, from the base 44' of the connector 43' mounted on the blade 3' for coupling the connecting cable 30' to the de-icing cable before folding the blade 3' with the fitting 61 relative to the cuff 5', the end 42'a of the hook 42' which end is linked to the cuff 5' is secured to a rotating part 72, mounted so that it can rotate about a stationary part 73 of a rotating coupling 71, of which the rotating part 72 and stationary part 73 are coaxial about the axis of pivoting B—B, by virtue of a pin extension 74 fixed to the pin 64. The stationary part 73 of the rotating connector 71 is fixed to the cuff 5' and coupled electrically and mechanically to the third stretch 41' of the cable 30' by a short stretch of cable 75. The latter has substantially the same shape of flattened rectangular transverse section as the stretch 41', as represented in FIG. 11, and its structure may be the same nonscreened structure as that of the stretch 41', with conducting wires 34 embedded in an insulating and elastically deformable matrix 35 between strips of fabric 36, like for the stretches 41 and 32 in the first example (see FIG. 2a). The coupling between the stretch 75 and the stretch 41' is achieved at the strap 50' for holding the cable 30' on the cuff 5' by fixing to the pins 54' for attaching the drag dampers 51' to the cuff 5'.

In this way, when the actuator 68 controls the pivoting of the fitting 61 with the blade 3' about the axis B—B, the overhead hook 42' of the cable 30' turns with the rotating part 72 of the rotating coupling 71 about this same axis B—B, at the same time as the blade 3', which makes any intervention on the connector 43' unnecessary.

Figure 9:

In this example, the first stretch of cable 31' consists of two parts 76 and 77 in series, of which the part 76 is straight and has the same screened structure and the same circular transverse section as the stretch of cable 31 of the previous example, as represented in FIG. 9, which shows a bundle of conducting wires 78 insulated from one another in a screened jacket 79, and which is similar to FIG. 12, representing in section the overhead hook 42', with the same section and the same structure as the hook 42 of the first example. This part 76 runs radially along the hub 2' between two neighbouring cavities 2'a of the hub 2', therefore between the internal clevis blocks 5'c and the laminated spherical stops 4' of two neighbouring cuffs 5', and its internal radial end 31'a is, like the corresponding end 31a of the stretch 31 of the previous example, mounted in the coupling 27' of the plug 28' of a screened connector 24', the base 25' of which is, on the one hand, fixed by its square flange 26' to a support denoted as 19' overall and mounted on the tubular central part of the hub 2' and, on the other hand, coupled mechanically and electrically to an electrical supply cable (not represented) having several conductors connected to the output of a collector (also not represented) housed in the tubular central part of the hub 2'.

Figure 10:
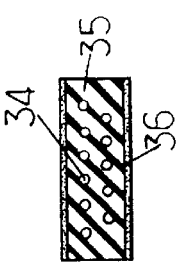

The external radial end of this radial part 76 is formed as a coupling 78, fixed to the hub 2' by a screw 79 in order to form a link between the cable 30' and the hub 2', and the coupling 78 also provides the electrical and mechanical coupling between the radial part 76 and the other part 77. The latter has a flattened rectangular transverse section of larger dimension substantially perpendicular to the axis of the rotor, and a nonscreened structure both of which are similar to those of the stretches of cable 41' and 75 of this example, and 32 and 41 of the previous example, and as represented by FIG. 10, which shows the electric conductive wires 34, substantially parallel and spaced apart and embedded in two superimposed rows in the insulating and elastically deformable matrix 35 between strips of fabric 36.

This cable part 77 rests flat on the hub 2' and runs substantially in the shape of an arc of a circle in a substantially circumferential direction around the axis of rotation of the rotor, on the external radial edge 2'b of one of the two cavities 2'a between which the radial part 76 runs. This part 77 runs substantially as far as the lateral edge closest to the internal clevis block 5'c of the cuff 5' held on this edge 2'b, to which this cable part 77 is coupled electrically and mechanically at the first end 32'a of the first overhead hook 32' linking the hub 2' to the cuff 5'. As represented in the sectional view of FIG. 8, this hook 32'a is orientated substantially in the circumferential direction, that is to say substantially transversely relative to the cuff 5' to which it is linked by its second end 32'b which is coupled electrically and mechanically to the internal radial end 41'a of the third stretch of cable 41' and fixed with this end 41'a to the upper face of the upper branch of the internal clevis block 5'c by a bolt 80. The hook 32' is formed of an elongate part of conducting cable having the same flattened rectangular shape section and same nonscreened structure as the stretch 41', and as represented by the sectional view of FIG. 11, and this elongate stretch is bent into a flattened half loop with the concavity turned towards the inside of the internal clevis block 5'c of the corresponding cuff 5', its first end 32'a being linked to the hub 2' at the same time as is the end that it covers of the cable part 77 in the shape of an arc of a circle, while its other end 32'b transversely covers the end 41'a of the stretch of cable 41', being fixed with it by the bolt 80 at the upper part of the cuff 5'.

Thanks to its construction and arrangement, this hook 32' has a flexibility in torsion and in bending which allows it to accommodate the relative movements of the cuff 5' and of the hub 2' under the effect of the centrifugal forces acting upon the blade 3' and the cuff 5' when the rotor is rotating, and of the angular deflections in terms of pitch, drag and flapping of the blade 3' and of the cuff 5'.

This second example of connecting cable 30' also comprises stretches of cable the sections and structures of which are adapted to suit the local stresses and fitting locations with, however, relative to the first example, the drawback of a less direct link between the hub and the blade, as a result of the first stretch 31' being formed in two parts 76 and 77, of which one, 76, is radial and the other, 77, in the shape of an arc of a circle in a substantially circumferential direction, but with the corresponding advantage of smaller bulk in the direction of the axis of the rotor at this radial part 76 which can rest directly on the hub 2' whereas the first radial stretch 31 of cable of the first example is suspended, cantilever fashion, over the corresponding cuff.

The third example, represented in FIG. 13, is identical to the example of FIGS. 1 and 2 in its first, second and third stretches of cable 31, 32 and 41, that is to say from the first connector 24 for linking to the support 19 for the cover 21 which is fixed to the hub 2, as far as the strap 50 for attachment to the lateral clevis blocks for the articulation of the drag dampers to the corresponding cuff, while from the strap 50 as far as the blade 3', the connecting cable is identical to that of the second example of FIGS. 6 and 7 and comprises a second overhead hook 42', the second end 42'b of which is coupled to the plug 47' of the second connector 43', the base 44' of which is fixed to the blade 3' and connected to the de-icing cable of the latter, while the first end 42'a of the hook 42' is integral in terms of rotation with the rotating part 72 of a rotating coupling 71, the stationary part 73 of which is coupled electrically and mechanically, at the strap 50, to the stretch of cable 41. Indeed, in this third example too, the root of the blade 3' is held in a clevis block 62 of a hinging fitting 61 articulated so that it can pivot about the axis B—B on the cuff by a hinging actuator 68, the rotating part 72 and stationary part 73 of the rotating coupling 71 being coaxial about this axis of hinging B—B. For this reason, the same references as in the previous examples have been used to denote the elements which are similar.

It is obvious that this third example of a connecting cable has the respective advantages afforded by those parts of the two prior examples which it adopts.

We claim:

1. An installation for electrical connection in a rotorcraft comprising:

at least one electric supply conductor and at least one electric de-icing conductor of an electric device for de-icing a blade of a rotorcraft rotor which rotor includes a hub integral in terms of rotation with a rotor mast about an axis of rotation of the rotor and at least two blades, each of which said blades is linked to the hub by a linking member which is substantially radial relative to the axis of rotation and which said linking member is linked to the hub by a retaining and articulating means, at least one connecting cable having at least one elongate electric conducting element coupling said supply conductor borne by the hub to said at least one electric de-icing conductor of said de-icing device borne by the blade, wherein the connecting cable comprises a first stretch including (a) a first end, in an internal radial position, linked to said supply conductor of the hub by a first connector mounted on the hub, and (b) a second end, a second stretch of the connecting cable, said second stretch comprising (a) a first end to which said second end of said first stretch is coupled, (b) a first overhead hook in the form of a flattened half loop, and (c) a second end linked to said de-icing conductor of said blade by a second connector fitted on an upper part of the blade, and at least said first hook having (a) an unscreened structure and exhibiting an elongate part of substantially flattened rectangular transverse section, a largest dimension of which said elongate part is substantially perpendicular to the axis of rotation, as well as (b) a concavity pointing substantially towards said retaining and articulating means, wherein said first hook being deformable in bending and in torsion in order to accommodate angular deflection in terms of pitch, drag and flapping of the blade and of the corresponding linking member relative to the hub.

2. An installation according to claim 1, wherein said second end of said second stretch of cable is linked to said second connector and is coupled to a first end of a third stretch of connecting cable running substantially radially along the corresponding linking member to which said third stretch is fixed by at least a first and a second link respectively close to said first end and second end thereof in an internal radial and external radial position respectively, the third stretch being linked by said second end thereof to said second connector and having a second unscreened structure exhibiting an elongate part of substantially flattened rectangular transverse section, the largest dimension of which said second unscreened structure is substantially perpendicular to the axis of rotation.

3. An installation according to claim 2, wherein said elongate part of one of said first hook and of said third stretch of the connecting cable comprises several elongate electric conducting elements which are substantially mutually parallel, spaced apart and embedded in an insulating and elastically deformable jacketing matrix between strips of fabric on long sides of said substantially rectangular transverse section of said elongate part.

4. An installation according to claim 2, in which each linking member is distinct from a root of the corresponding blade and includes an external radial part arranged as an external clevis block in which said blade root is held, wherein the second end of the third stretch of cable is linked to said second connector and is coupled to a first end of a fourth stretch of cable comprising a second overhead hook running from said linking member to the blade, and wherein a second end of said fourth stretch is coupled to said second connector.

5. An installation according to claim 4, wherein the second hook of the connecting cable exhibits a rounded transverse section, and the second connector comprises, (a) a base coupled tb said de-icing conductor of the blade and equipped with a flange for fixing to the blade, and, (b) a plug connected to the base and equipped with a coupling mounted on the second end of said fourth stretch of cable linked to the blade.

6. An installation according to claim 4, in which the root of each blade is held in said external clevis block of the corresponding linking member by two substantially mutually parallel pins, one of which said pins is removable to allow the blade to be folded back relative to the linking member by pivoting about the other of said pins, and wherein a plug of the second connector on the second end of the fourth stretch of cable is connected removably to a corresponding base of the second connector.

7. An installation according to claim 4, in which, for each linking member, said external clevis block holding the root of the corresponding blade is (a) arranged in a hinging fitting constituting an external radial part of the linking member and (b) mounted on the radial part by a link pivoting about an axis of hinging of the blade with the fitting relative to said linking member, and wherein the second hook of the connecting cable runs from the second connector on the blade to a rotating part of a rotating coupling also comprising a stationary part on the linking member, and the rotating part is mounted on said stationary part so that said rotating part can rotate coaxially with the pivoting link of the hinging fitting on the linking member, the stationary part of the rotating coupling being linked to the second end, in external radial position, of the third stretch of cable by a part of the fourth stretch of cable which runs along the linking member.

8. An installation according to claim 1, wherein the first stretch of cable comprises at least one radial part of rounded transverse section, an internal radial end of said radial part is mounted in a coupling of a plug of the first connector, said plug complementing a base of the first connector, which base is coupled to the supply conductor on the hub and has a flange mounted on the hub.

9. An installation according to claim 7, wherein the radial part of the first stretch of cable runs along substantially an entire length of the first stretch above the linking member and substantially in a same radial direction as said linking member, the first hook of the cable having a concavity pointing substantially radially towards the axis of rotation.

10. An installation according to claim 8, wherein the radial part of the first stretch of cable runs between two neighbouring linking members of the rotor, and an external radial end of said radial part is fixed to the hub by a link and extended towards the first hook of the cable by part of the first stretch (a) running in a substantially circumferential direction on the hub and (b) being of substantially flattened rectangular transverse section with the largest dimension thereof substantially perpendicular to the axis of rotation, the first hook having a concavity pointing in a substantially circumferential direction towards the corresponding linking member.

11. An installation according to claim 5, wherein at least a part of the rounded transverse section of the cable is coupled to at least a part of the substantially flattened rectangular section by a coupling with changing section.

12. An installation according to claim 1, further comprising a connecting clamp overmoulded on the connecting cable which links the connecting cable to the linking member.

13. An installation according to claim 2, in which an internal radial part of each linking member is arranged as an internal clevis block, and a corresponding retaining and articulating means comprises an armature fixed between the branches of the internal clevis block by threaded spindles with a head retained by head retainers, wherein the first link of the connecting cable to the linking member is provided using at least one support for said head retainers, said support itself being retained on the linking member by at least one of said threaded spindles.

14. An installation according to claim 2 in which each linking member is linked to the hub by two drag dampers each articulated by one end in one respectively of two clevis blocks projecting laterally on the opposite sides of the linking member radially on the outside of the corresponding retaining and articulating means, wherein the second link of the connecting cable to the linking member is provided using a strap arranged transversely on the linking member on which said strap is held by retaining pins which hold the drag dampers in said side clevis blocks.

15. An installation according to claim 14, wherein the connecting cable includes, opposite the strap, an overmoulded clamp fixed to the strap.

16. An installation according to claim 2, wherein the connecting cable is fixed to the linking member by an additional link part way between the first link and second link, the additional link being provided by a sliding bearing comprising a part projecting beneath the third stretch of cable and in a shape of a dovetail, and which said additional link is mounted so that said additional link can slide in the radial direction of the linking member in a complementary dovetail-shaped recess formed in an upper part of the linking member.

17. An installation according to claim 16, wherein the dovetail-shaped recess is formed in a sliding bearing plate fixed on a top face of the linking member.

18. An installation according to claim 16, wherein the dovetail-shaped recess is formed directly in the upper part of the linking member.

* * * * *